United States Patent [19]
Lockshaw et al.

[11] Patent Number: 5,633,053
[45] Date of Patent: *May 27, 1997

[54] STRUCTURAL ELEMENT WITH INTERMEDIATE RIBBING SUPPORT

[76] Inventors: James J. Lockshaw; Stephen Kelly; Randall Walker; John Kaiser, Jr., all of 18341 Jamboree Rd., Irvine, Calif. 92715-1073

[*] Notice: The term of this patent shall not extend beyond the expiration date of Pat. No. 5,273,806.

[21] Appl. No.: 440,622

[22] Filed: May 15, 1995

Related U.S. Application Data

[63] Continuation-in-part of Ser. No. 173,611, Dec. 27, 1993, Pat. No. 5,487,930, which is a continuation-in-part of Ser. No. 771,009, Oct. 3, 1991, Pat. No. 5,273,806, and Ser. No. 332,516, Oct. 31, 1994.

[51] Int. Cl.⁶ ............................................ B32B 3/00
[52] U.S. Cl. ............................. 428/33; 428/53; 428/120; 428/133; 428/172; 428/178; 52/793.11
[58] Field of Search .................... 428/167, 120, 428/53, 101, 33, 119, 133, 172, 178, 166; 52/793.11

[56] References Cited

U.S. PATENT DOCUMENTS

| | | | |
|---|---|---|---|
| 4,304,821 | 12/1981 | Hayase et al. | 428/593 |
| 4,957,788 | 9/1990 | Colonel | 428/33 |
| 5,273,806 | 12/1993 | Lockshaw et al. | 428/167 |
| 5,487,930 | 1/1996 | Lockshaw et al. | 428/167 |

*Primary Examiner*—Donald Loney
*Attorney, Agent, or Firm*—Louis J. Bachand

[57] ABSTRACT

Structural elements of great thickness are provided by having limited extent ribbing projecting from each surface structure coupled by junctions having extents which combined with the ribbing extents bridges the distance between the surface structures of the structural elements.

37 Claims, 4 Drawing Sheets

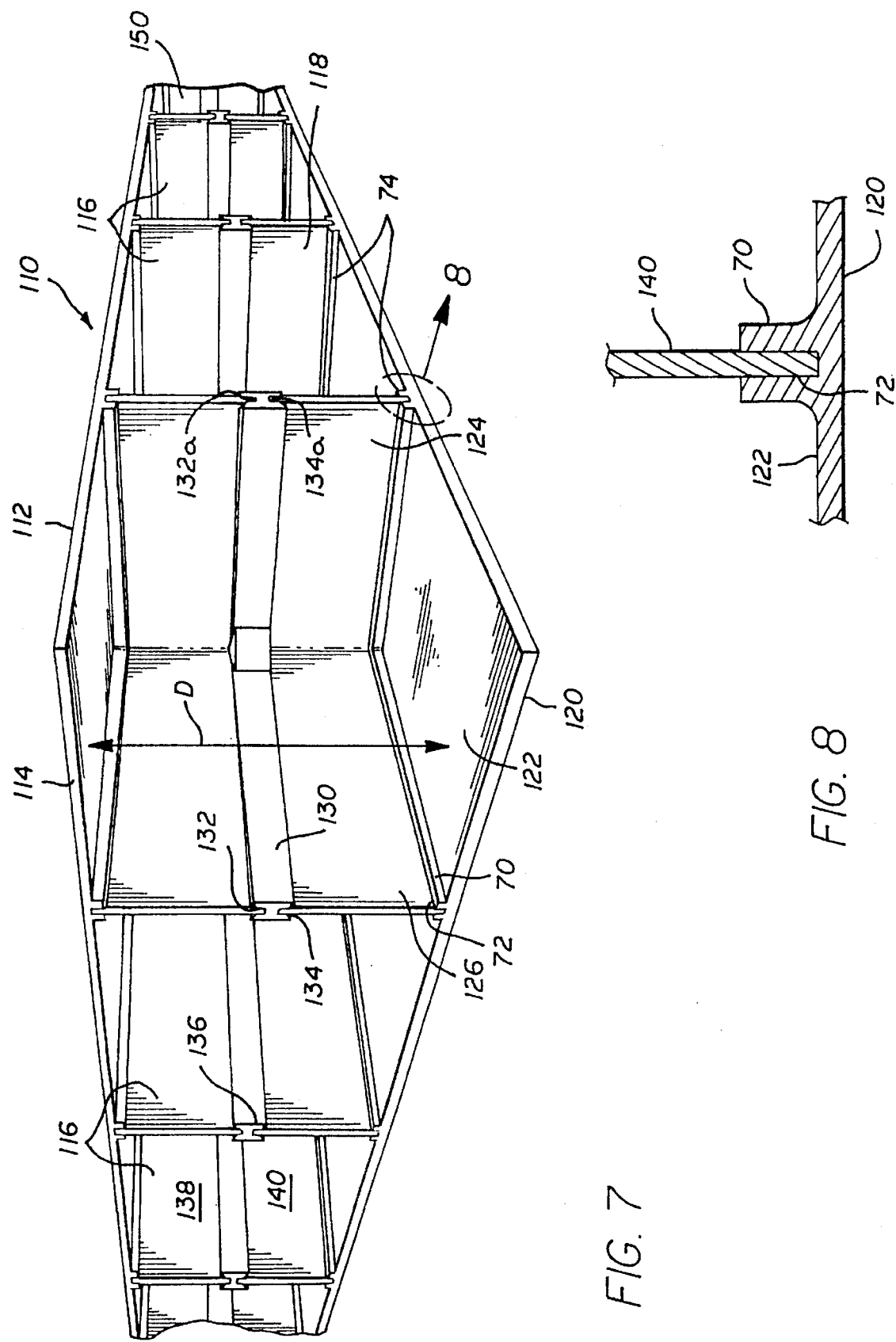

STRUCTURAL ELEMENT WITH INTERMEDIATE RIBBING SUPPORT

REFERENCE TO RELATED APPLICATIONS

This is a continuation-in-part of application Ser. No. 08/173,611, filed on Dec. 27, 1993, now U.S. Pat. No. 5,487,930 which is a continuation-in-part of application Ser. No. 07/771,009, filed Oct. 3, 1991 now U.S. Pat. No. 5,273,806, and a continuation-in-part of application Ser. No. 08/332,516, filed Oct. 31, 1994 allowed.

TECHNICAL FIELD

This application relates to structural elements, ranging from aircraft components to enclosures, which are lightweight, extremely strong, widely variable in size, configuration and material of construction, easy to manufacture with widely available equipment, and free of the problems associated with other forms of structural elements serving some of the same purposes, such as honeycomb panels. As the uses of these structural elements multiply, the need for more versatile configurations and easier fabrication has become evident, particularly with respect to obtaining increased height in the structural elements without sacrifice of the advantages that make these structural elements desirable in the first place.

BACKGROUND OF THE INVENTION

In U.S. Pat. No. 5,273,806, structural elements are disclosed which comprises surface structures and ribbing by which the surface structures are joined. In one form, the surface structures define registerable patterns of ribbing which are joined to space the surface structures and complete the structural element.

SUMMARY OF THE INVENTION

The surface structures and ribbing are machined metal or fiber reinforced resin structures. Where the ribbing is extended distances greater than conveniently machined or wound, structural element manufacture can become problematical.

It is an object, therefore, to provide improvements in the design of structural elements. It is another object to provide structural element designs which are readily constructed despite having extended distances between the opposed surface structures. It is another object to provide structural elements in which the ribbing extending from the opposed surface structures is limited in height relative to the distance between the opposed surface structures so as to be easily machined, and is coupled with complementary ribbing in a manner using a third member coupling such that the full distance is traversed between the surface structures while preserving ease of manufacture. It is yet another object to provide a structural element in which the surface structures have ribbing extending less than distance between them and there are interposed junctions to join the respective ribbing extents and joints at each locus of intersection of the ribbings.

These and other objects of the invention to become apparent hereinafter are realized in a structural element comprising first and second laterally and longitudinally extended surface structures spaced apart a predetermined distance, the surface structures defining respectively first and second opposed closed figure patterns of ribbing including rib segments extending vertically a combined distance less than the predetermined distance, and a laterally and longitudinally disposed series of junctions connecting the rib segments in predetermined distance bridging relation.

In this and like embodiments, typically, the closed figure patterns are generally rectangular, at least one or each of the surface structures is comprised of metal, or the surface structures each comprise fiber reinforced resin, the rib segments are metal, the surface structures are metal and the first and second rib segments are integrally formed with their respective surface structures, or the surface structures comprise fiber reinforced resin and the first and second rib segments are integrally formed with their respective surface structures.

Further, in preferred embodiments, the predetermined distance is constant between the surface structures, the surface structures are planar, the surface structures can be parallel, or not, and the rib segments comprise thin, elongated, and vertically extended members separately formed from the surface structures and secured thereto in closed figure defining relation.

In a further embodiment, there is provided a structural element comprising first and second laterally and longitudinally extended surface structures spaced apart a predetermined distance, the surface structures defining respectively first and second opposed closed figure patterns of ribbing including rib segments comprising thin, elongated and vertically extended members having upper and lower edges in a common plane, the ribbing segment members extending vertically a combined distance less than the predetermined distance, and a laterally and longitudinally disposed series of junctions connecting the rib segments in predetermined distance bridging relation.

In this and like embodiments, typically, the ribbing segment members are oriented edgewise to the surface structures, the junctions cooperate with the ribbing segment member edges to join opposed members, and the junctions comprise elongated sections defining upwardly and downwardly opening grooves adapted to receive edgewise the segment members.

In a further embodiment, there is provided a structural element comprising first and second laterally and longitudinally extended surface structures spaced apart a predetermined distance, the surface structures defining respectively first and second opposed closed figure patterns of ribbing including rib segments extending vertically a combined distance less than the predetermined distance, and a laterally and longitudinally disposed series of junctions connecting the rib segments in predetermined distance bridging relation, the junctions comprising elongated sections adapted to cooperate with pairs of opposed ribbing segments in locking relation.

In this and like embodiments, typically, the junctions define upwardly and downwardly opening grooves for receiving the ribbing segments in edgewise and locked relation, the junction grooves are sized and spaced to extend in combination with the opposed ribbing segments received therein a distance equal to the predetermined distance, the ribbing segments comprise thin, elongated, and vertically extended members integrally formed with the surface structures.

In a further embodiment, there is provided a structural element comprising first and second laterally and longitudinally extended surface structures spaced apart a predetermined distance, the surface structures defining respectively first and second opposed closed figure patterns of ribbing including rib segments extending vertically a combined distance less than the predetermined distance, a laterally and longitudinally disposed series of junctions connecting the rib segments in predetermined distance bridging relation, multiple ones of the ribbing segments projecting longitudinally from the junctions to a locus of intersection defining a corner of the closed figure pattern, and including also a joint at each the locus of ribbing segment intersection, the joints supporting the ribbing segments relative to each other at their nodes between the junctions.

In this and like embodiments, typically, the joint comprises a body having a plurality of upper and lower ribbing segment-receiving grooves at right angles to each other to receive the opposed ribbing segments laterally and longitudinally disposed within each the locus of intersection in predetermined distance bridging relation.

In another embodiment, the invention provides a structural element comprising first and second laterally and longitudinally extended surface structures spaced apart a predetermined distance, the surface structures defining respectively first and second opposed, generally rectangular, closed figure patterns of ribbing including rib segments extending vertically a combined distance less than the predetermined distance, and a laterally and longitudinally disposed series of junctions connecting the rib segments in predetermined distance bridging relation.

In this and like embodiments, typically, the surface structures are comprised of metal or fiber reinforced resin, the surface structures and the first and second rib segments are integrally formed with their respective surface structures, the predetermined distance is constant between the surface structures, the surface structures are planar, the surface structures are parallel, the rib segments comprise thin, elongated and vertically extended members, the rib segment members extending vertically a combined distance less than the predetermined distance, and there is also included a laterally and longitudinally disposed series of junctions connecting the rib segment members in predetermined distance bridging relation, the rib segment members being oriented edgewise to the surface structures, the junctions cooperate with the rib segment member edges to join opposed members, the junctions comprise elongated sections defining upwardly and downwardly opening grooves adapted to receive edgewise the rib segment members, the junction grooves are sized and spaced to extend in combination with the opposed rib segments received therein a distance equal to the predetermined distance, the rib segment members periodically defining a locus of intersection, and including also a joint at each the locus of rib segment member intersection, the joints supporting the rib segment members relative to each other between the junctions, each joint comprising a body having a plurality of upper and lower rib segment-receiving grooves at right angles to each other to receive the opposed rib segment members laterally and longitudinally disposed within each locus of intersection in predetermined distance bridging relation.

In a highly particularly preferred embodiment, the invention provides a structural element comprising first and second laterally and longitudinally extended generally parallel, planar surface structures of metal or fiber reinforced resin spaced apart a predetermined distance, the surface structures defining respectively first and second opposed, generally rectangular, closed figure patterns of ribbing including integrally formed with their respective the surface structures thin, elongated rib segment members having upper and lower edges in the same plane edgewise to the surface structures and extending vertically a combined distance less than the predetermined distance, and a laterally and longitudinally disposed series of junctions cooperating with the rib segment member edges to join opposed rib segment members in predetermined distance bridging relation, the junctions comprising elongated sections defining upwardly and downwardly opening grooves adapted to receive edgewise the segment members, the junction grooves being sized and spaced to extend in combination with the opposed rib segments received therein a distance equal to the predetermined distance; the rib segment members periodically defining a locus of intersection; and including also a joint at each the locus of rib segment member intersection, the joints each comprising a body having a plurality of upper and lower segment member receiving grooves at right angles to each other to receive opposed rib segment members laterally and longitudinally disposed with each locus of intersection in predetermined distance bridging relation, the joints supporting the rib segment members relative to each other at their nodes between the junctions.

DESCRIPTION OF THE DRAWINGS

The invention will be further described in conjunction with the attached drawings in which:

FIG. 7 is a view like FIG. 1 of a second embodiment of the invention; and,

FIG. 8 is a view taken on line 8 in FIG. 7.

DESCRIPTION OF THE PREFERRED EMBODIMENTS

The term a "closed figure pattern of ribbing" herein refers to a series of laterally or longitudinally adjacent closed figures of ribbing forming a closed pattern. A "closed figure" is one in which all ribbing sides intersect another ribbing side, and one in which a straight line drawn anywhere through the figure will intersect ribbing in at least two places, including a circle, triangle and rectangle in which adjacent segments of ribbing are contiguous, as well as circular and rectangular spirals and other figures wherein although rib segments of the ribbing are arranged about a common point and adjacent segments are not always contiguous, a straight line drawn anywhere through the figure will intersect the ribbing in at least two places.

Figure 1:
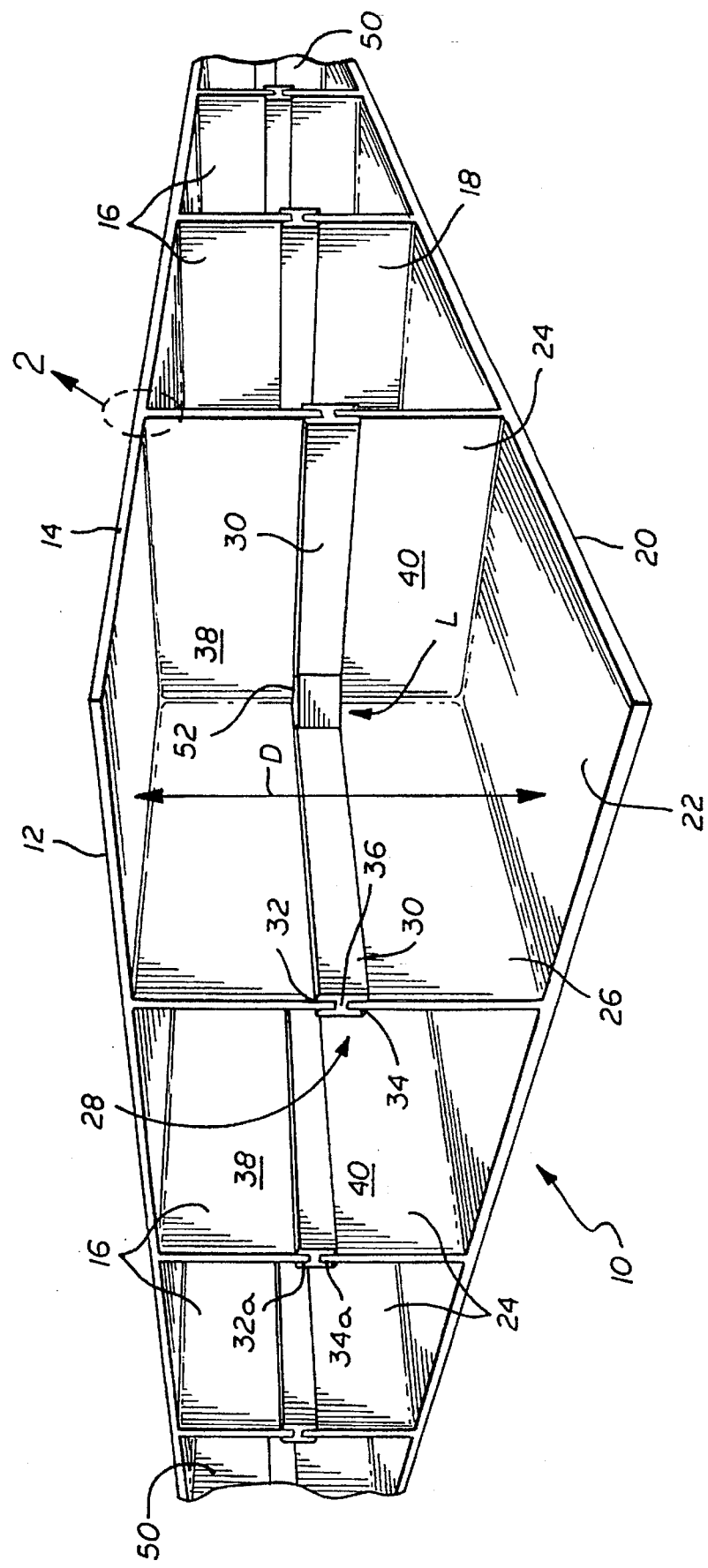
FIG. 1 is a perspective view of the invention structural element.
Figure 2:
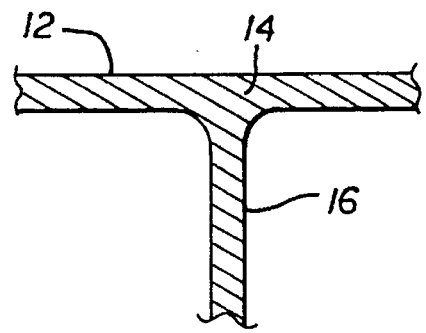
FIG. 2 is a view taken on line 2 in FIG. 1.
Figure 3:
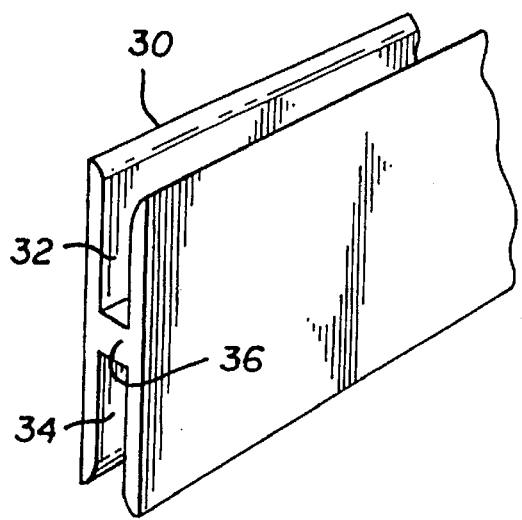
FIG. 3 is a fragmentary, perspective view of a coupling junction.

With reference to the drawings, in FIGS. 1 and 2 a structural element 10 is shown comprising a first or upper surface structure 12 comprising a generally planar surface portion 14 and machined thereinto from a unitary metal mass, or wound therewith in the case of fiber reinforced resin structures, an integral pattern of ribbing 16 arranged in a series of closed figures 18. Ribbing 16 extends a vertical distance which is convenient to machine or otherwise fabricate, and does not cover the vertical distance D between the upper surface structure 12 and the lower surface structure 20. The distance D can be constant as where the upper and lower surfaces structures 12, 20 are parallel or not constant where there is a variance in the spacing of the surface structures across their extent. The second or lower surface structure 20 comprises a generally planar surface portion 22 and formed thereon also from a unitary metal mass, or from fiber reinforced resin, an integral pattern of ribbing 24 arranged in a series of closed figures 26. Ribbing 24 is in the same pattern as ribbing 16 and like the latter ribbing extends a vertical distance which is convenient to fabricate but which does not cover the distance D between the upper and lower surface structures 12, 20 either alone or in combination with opposing ribbing 16.

Figure 5:
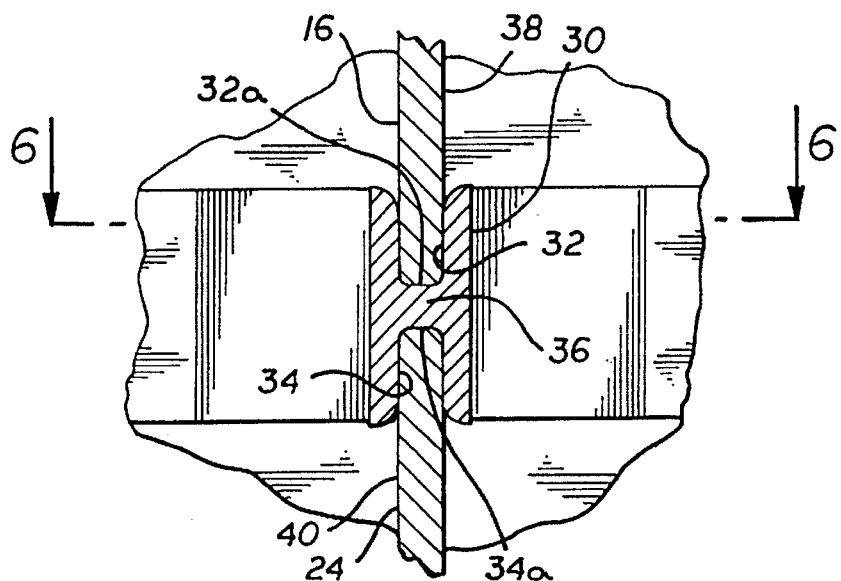
FIG. 5 is a view in transverse section of rib segments coupled together with a junction.

In the invention structural element 10, the gap 28 between the opposing closed patterns of ribbing 16, 24 is filled and the ribbing supported in fixed position by the interposition of junctions 30, which are metal, reinforced resin or other rigid material, H-shaped units, which define oppositely facing grooves 32, 34 extending from junction longitudinal web 36 to receive and enclose the outer edges 32a, 34a of the rib segments 38, 40 of the ribbing 16, 24. See FIGS. 5 and 6. The web 36 of the junctions 30 is sized to fill the gap 28 and with the received rib segments 38, 40 bridge the distance D between the surface structures 12, 20. In this manner the deep machining that might otherwise be required to obtain thick sections of structural element 10 is avoided.

The outermost portion of the ribbing 16, 34 with junctions 30 forms an enclosing wall 50 to which components and parts can be affixed.

Figure 6:
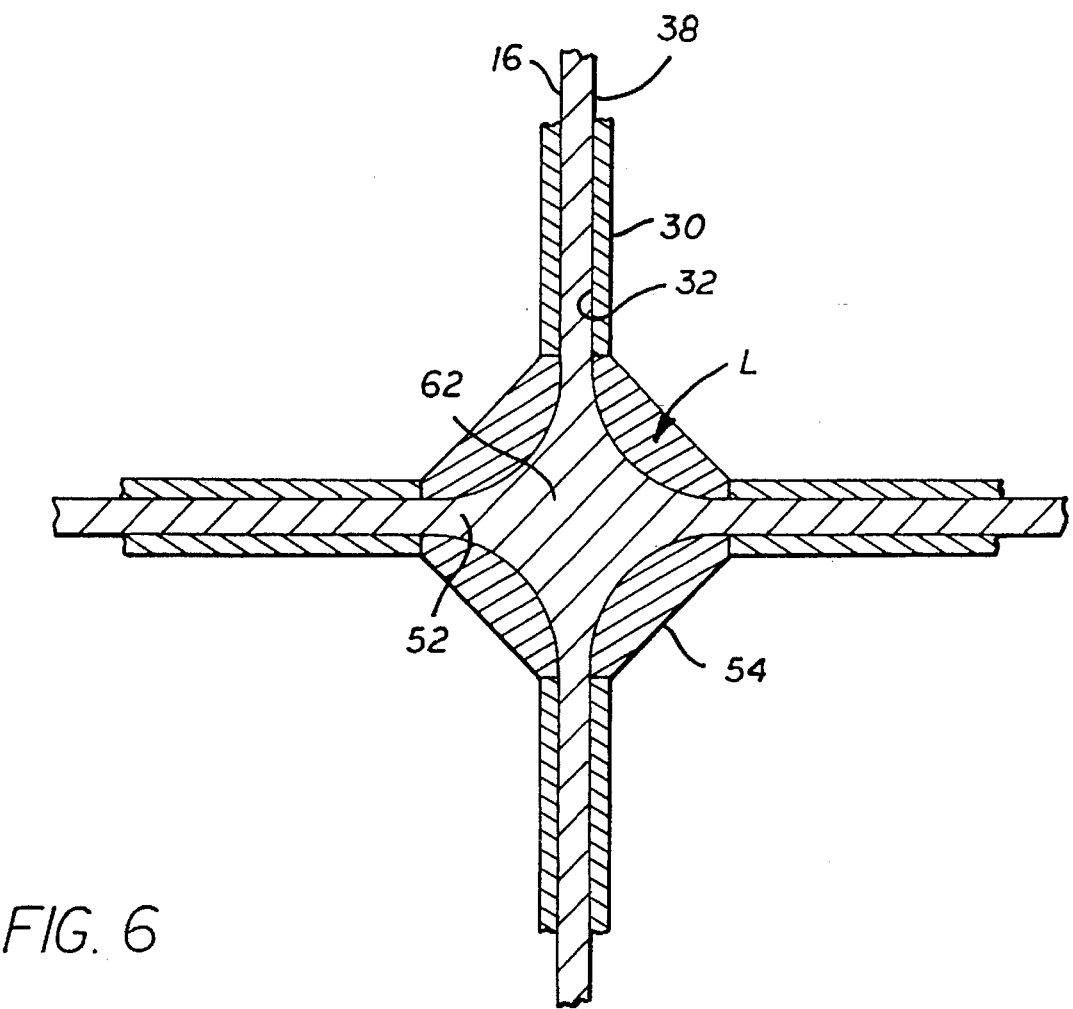
FIG. 6 is a view taken on line 6—6 in FIG. 5.

The junctions 30 are typically unitary structures of the same material as the ribbing 16, 34 received therein, but materials unlike to the ribbing can be used, and a single junction structure can be fabricated of different materials. The received ribbing 16, 24 is fixed in the grooves 32, 34 of junctions 30 with adhesive, welding or other suitable techniques. The junctions 30 generally extend nearly the full length of the rib segments 38, 40, leaving a portion 52 of each rib segment adjacent the locus of intersection L of the rib segments, that is where the rib segments aligned longitudinally intersect the rib segments aligned laterally. (FIG. 6).

Figure 4:
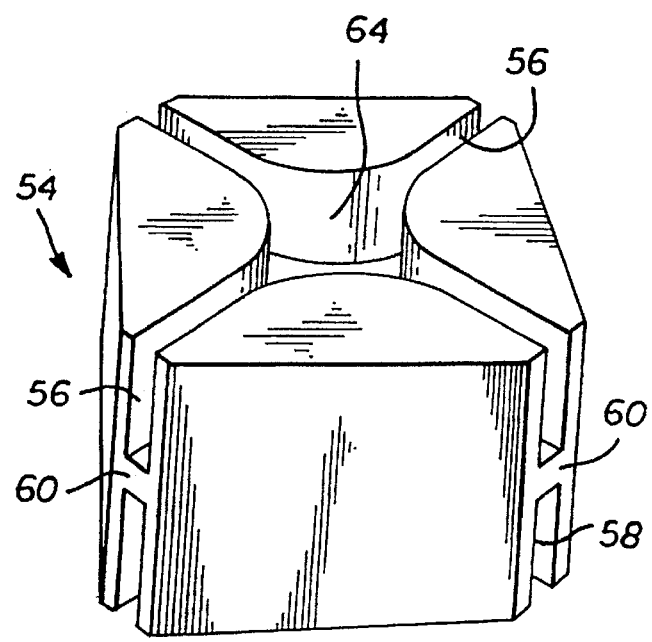
FIG. 4 is a perspective view of a coupling joint.

The portions 52 of the rib segments 38, 40 extend beyond the junctions 30 and are supported by a series of joints 54. Joints 54 are generally unitary bodies of suitably rigid material such as metal which define upper and lower grooves 56, 58, spaced by webs 60, the grooves being sized to receive portions 52 of the rib segments and the ribbing node 62 at the juncture of the rib segments 38, 40 in the locus of intersection L of the ribbing 16, 24. With particular reference to FIGS. 4 and 6, it will be noted that the joint 54 is recessed at 64 to fit about the ribbing node 62. The joint 54 is fixed to the ribbing 16, 24 and ribbing node 62 with adhesive, by welding or other means.

The resulting assembly comprises opposed surface structures 12, 20, secured together by way of their integral ribbings 16, 24 coupled at their outer edges 32a, 34a and intermediate the ribbing nodes 62 with junctions 30 and at their ribbing nodes with joints 54. Any gap 28 between the combined vertical extents of the opposed ribbings 16, 24 as a result of the predetermined distance D between the surface structures 12, 20 is filled by the junctions 30. The joints 54 complete the overall assembly when placed at the intersections of the ribbings 16, 24.

In a further embodiment, shown in FIGS. 7 and 8, wherein like parts to the embodiment of FIGS. 1-6 are given like numerals plus 100, the surface structures 112, 120, of structural element 110, have greatly shortened ribbing 70 integrally formed with them, in pairs to define slots 72, in a closed figure pattern 74. Separately formed rib segments 138, 140 are fitted into the surface structure slots 72 to project from the surface structures 112, 120. See FIG. 8. Rib segments 138, 140, do not in combination extend the distance D between the surface structures 112, 120. At their outer edges 132a, 134a, the rib segments 138, 140 are fitted to the junctions 130 and the joints 154 as described in connection with the previous embodiment to form the illustrated assembly.

As noted briefly above, useful materials for fabrication of the invention structural elements can be metals, particularly aluminum and titanium or other metals, composites of fibers, such as carbon, metal and glass fibers, and resins such as epoxy, urethane and engineering thermoplastics, and other materials of suitable strength, machinability, or fabricability.

The invention thus provides improvements in the design of structural elements which are readily constructed despite having extended distances between the opposed surface structures and in which the ribbing extending from the opposed surface structures is limited in height relative to the distance between the opposed surface structures so as to be easily machined, and is coupled with complementary ribbing in a manner using couplings such that the full distance is traversed between the surface structures while preserving ease of manufacture. Structural elements are obtained in which the surface structures have ribbing extending less than the distance between them and there are interposed junctions to join the respective ribbing extents and joints at each locus of intersection of the ribbings. Multiple sets of rib segments and junctions and joints can be aligned and used to bridge even greater distances between surface structures. The foregoing objects are thus met.

We claim:

1. Structural element comprising first and second laterally and longitudinally extended surface structures spaced apart a predetermined distance, said surface structures defining respectively first and second opposed closed figure patterns of ribbing including rib segments extending vertically a combined distance less than said predetermined distance, and a laterally and longitudinally disposed series of junctions connecting said rib segments in predetermined distance bridging relation.

2. Structural element according to claim 1, in which said closed figure patterns are generally rectangular.

3. Structural element according to claim 1, in which at least one of said surface structures is comprised of metal.

4. Structural element according to claim 2, in which each of said surface structures is metal.

5. Structural element according to claim 1, in which said surface structures each comprise fiber reinforced resin.

6. Structural element according to claim 1 in which said rib segments are metal.

7. Structural element according to claim 6, in which said surface structures are metal and said first and second rib segments are integrally formed with their respective surface structures.

8. Structural element according to claim 1, in which said surface structures comprise fiber reinforced resin and said first and second rib segments are integrally formed with their respective surface structures.

9. Structural element according to claim 1, in which said predetermined distance is constant between said surface structures.

10. Structural element according to claim 1, in which said surface structures are planar.

11. Structural element according to claim 1, in which said surface structures are parallel.

12. Structural element according to claim 11, in which said surface structures are planar.

13. Structural element comprising first and second laterally and longitudinally extended surface structures spaced apart a predetermined distance, said surface structures defining respectively first and second opposed closed figure patterns of ribbing including rib segments comprising thin, elongated and vertically extended members having upper and lower edges in a common plane, said ribbing segment members extending vertically a combined distance less than said predetermined distance, and a laterally and longitudinally disposed series of junctions connecting said rib segments in predetermined distance bridging relation.

14. Structural element according to claim 13, in which said ribbing segment members are oriented edgewise to said surface structures.

15. Structural element according to claim 14, in which said junctions cooperate with said ribbing segment member edges to join opposed members.

16. Structural element according to claim 15, in which said junctions comprise elongated sections defining upwardly and downwardly opening grooves adapted to receive edgewise said segment members.

17. Structural element comprising first and second laterally and longitudinally extended surface structures spaced apart a predetermined distance, said surface structures defining respectively first and second opposed closed figure patterns of ribbing including rib segments extending vertically a combined distance less than said predetermined distance, and a laterally and longitudinally disposed series of junctions connecting said rib segments in predetermined distance bridging relation, said junctions comprising elongated sections adapted to cooperate with pairs of opposed ribbing segments in locking relation.

18. Structural element according to claim 17, in which said junctions define upwardly and downwardly opening grooves for receiving said ribbing segments in edgewise and locked relation.

19. Structural element according to claim 18, in which said junction grooves are sized and spaced to extend in combination with said opposed ribbing segments received therein a distance equal to said predetermined distance.

20. Structural element according to claim 1, in which said ribbing segments comprise thin, elongated, and vertically extended members integrally formed with said surface structures.

21. Structural element according to claim 1, in which said ribbing segments comprise thin, elongated, and vertically extended members separately formed from said surface structures and secured thereto in closed figure defining relation.

22. Structural element comprising first and second laterally and longitudinally extended surface structures spaced apart a predetermined distance, said surface structures defining respectively first and second opposed closed figure patterns of ribbing including rib segments extending vertically a combined distance less than said predetermined distance, a laterally and longitudinally disposed series of junctions connecting said rib segments in predetermined distance bridging relation, multiple ones of said ribbing segments projecting longitudinally from said junctions to a locus of intersection defining a corner of said closed figure pattern, and including also a joint at each said locus of ribbing segment intersection, said joints supporting said ribbing segments relative to each other between said junctions.

23. Structural element according to claim 22, in which each said joint comprises a body having a plurality of upper and lower ribbing segment-receiving grooves at right angles to each other to receive the opposed ribbing segments laterally and longitudinally disposed within each said locus of intersection in predetermined distance bridging relation.

24. Structural element comprising first and second laterally and longitudinally extended surface structures spaced apart a predetermined distance, said surface structures defining respectively first and second opposed, generally rectangular, closed figure patterns of ribbing including rib segments extending vertically a combined distance less than said predetermined distance, and a laterally and longitudinally disposed series of junctions connecting said rib segments in predetermined distance bridging relation.

25. Structural element according to claim 24, in which said surface structures are comprised of metal or fiber reinforced resin.

26. Structural element according to claim 25, in which said surface structures and said first and second rib segments are integrally formed with their respective surface structures.

27. Structural element according to claim 26, in which said predetermined distance is constant between said surface structures.

28. Structural element according to claim 27, in which said surface structures are planar.

29. Structural element according to claim 28, in which said surface structures are parallel.

30. Structural element according to claim 25, in which rib segments comprise thin, elongated and vertically extended members, said ribbing segment members extending vertically a combined distance less than said predetermined distance, and including also a laterally and longitudinally disposed series of junctions connecting said rib segment members in predetermined distance bridging relation.

31. Structural element according to claim 30, in which said ribbing segment members are oriented edgewise to said surface structures.

32. Structural element according to claim 31, in which said junctions cooperate with said ribbing segment member edges to join opposed members.

33. Structural element according to claim 32, in which said junctions comprise elongated sections defining upwardly and downwardly opening grooves adapted to receive edgewise said segment members.

34. Structural element according to claim 33, in which said junction grooves are sized and spaced to extend in combination with said opposed ribbing segments received therein a distance equal to said predetermined distance.

35. Structural element according to claim 34, in which said ribbing segment members periodically define a locus of intersection, and including also a joint at each said locus of ribbing segment member intersection, said joints supporting said ribbing segment members relative to each other between said junctions.

36. Structural element according to claim 35, in which each said joint comprises a body having a plurality of upper and lower ribbing segment-receiving grooves at right angles to each other to receive the opposed ribbing segment members laterally and longitudinally disposed within each said locus of intersection in predetermined distance bridging relation.

37. Structural element comprising first and second laterally and longitudinally extended generally parallel, planar surface structures of metal or fiber reinforced resin spaced apart a predetermined distance, said surface structures defining respectively first and second opposed, generally rectangular, closed figure patterns of ribbing including integrally formed with their respective said surface structures thin, elongated rib segment members having upper and lower edges in the same plane edgewise to said surface structures and extending vertically a combined distance less than said predetermined distance, and a laterally and longitudinally disposed series of junctions cooperating with said rib segment member edges to join opposed rib segment members in predetermined distance bridging relation, said junctions comprising elongated sections defining upwardly and downwardly opening grooves adapted to receive edgewise said segment members, said junction grooves being sized and spaced to extend in combination with said opposed ribbing segments received therein a distance equal to said predetermined distance; said ribbing segment members periodically defining a locus of intersection; and including also a joint at each said locus of ribbing segment member intersection, said joints each comprising a body having a plurality of upper and lower segment member receiving grooves at right angles to each other to receive opposed ribbing segment members laterally and longitudinally disposed with each locus of intersection in predetermined distance bridging relation, said joints supporting said ribbing segment members relative to each other between said junctions.

* * * * *